Feb. 11, 1941.  H. H. CURRY  2,231,521
CONTROL SYSTEM FOR ALTERNATING CURRENT MARINE PROPULSION APPARATUS
Filed March 8, 1940  6 Sheets-Sheet 1

Fig. 1.

WITNESSES:
C. J. Weller.
Wm. J. Ruano

INVENTOR
Herman H. Curry.
BY
Paul E. Friedemann
ATTORNEY

Feb. 11, 1941. H. H. CURRY 2,231,521
CONTROL SYSTEM FOR ALTERNATING CURRENT MARINE PROPULSION APPARATUS
Filed March 8, 1940 6 Sheets-Sheet 2

Fig. 1a.

WITNESSES:

INVENTOR
Herman H. Curry.
BY
ATTORNEY

Fig. 6.

UNITED STATES PATENT OFFICE 2,231,521

CONTROL SYSTEM FOR ALTERNATING CURRENT MARINE PROPULSION APPARATUS

Herman H. Curry, Montgomery County, Md., assignor to Westinghouse Electric & Manufacturing Company, East Pittsburgh, Pa., a corporation of Pennsylvania Application March 8, 1940, Serial No. 322,953

10 Claims. (Cl. 290—17)

My system of control relates to a method of controlling the speed of an alternating current electric motor for use as a main propelling motor for ships, or similar application, and in which the motor is supplied with energy from a generator driven by a variable speed Diesel engine or other prime mover having a limited lower speed and in which the lower speed range desired from the main motor is lower than that which may be obtained synchronously.

Certain objects of my invention are to simply and reliably control from the bridge of a ship the speed and direction of a Diesel electric type of marine drive (or similar apparatus using a synchronous type of alternating current motor) through the action of but one lever or other means of control; to provide a method of operating below synchronous idling speed; to provide means for reliably synchronizing at a definite speed while transmitting little or no torque; and to control the engine speed without the possibility of overloading regardless of changing propeller torque requirements due to towing, ice breaking or other abnormal conditions.

Other objects and advantages will become more apparent from a study of the following specification when considered in conjunction with the accompanying drawings, in which.

An outstanding principle involved is that of operating a synchronous motor, provided with a high resistance squirrel cage starting winding in the pole faces as a synchronous motor which is supplied a variable frequency and voltage over that part of the speed range which may be covered synchronously by varying the speed of the prime mover driving the generator, and as a wound rotor or squirrel cage induction motor which is supplied a constant frequency but variable voltage for the purpose of speed control below the speed range possible as a synchronous motor. The principle may be applied to similar applications where the required motor torque increases rapidly as a function of speed and where the power required is comparatively small at low speeds.

As an example of the application assume a three-phase synchronous motor having a squirrel cage starting winding and driving a propeller or similar load. This motor is driven by one or more separately excited, three-phase alternators. These alternators may be connected in series or parallel to supply the motor load. The advantage of the series connection is that the possibility of heavy synchronizing currents between generators is avoided. Each generator is driven by a variable speed engine having a governor capable of at least two speed settings; namely, idling and full speed, or may be continuously variable over the desired range, but having an adjustable stop or other equivalent device, limiting the amount of fuel per stroke which may be injected. This stop limits the maximum amount of fuel only, but at no time prevents the governor's reducing of the amount of fuel per stroke should the engine speed exceed that for which the governor is set. This governor and an adjustable fuel limiting device will be so connected, mechanically or otherwise, with a control device on the bridge that for any speed setting of the control device above that corresponding to synchronous speed of the motor at engine idling speed, the amount of fuel injected will be controlled by the stop with the governor set for a higher speed to operate as a speed limiting and emergency control device only. At speeds below that corresponding to synchronism at the desired minimum idling speed of the engine, the governor will control the amount of fuel with the stop set as a device for limiting the mean effective pressure of the engine to the maximum value desired.

The generator and motor fields will also be controlled by this bridge control device as outlined below. The engine governors and/or fuel limiting adjustment will be so interlocked with the motor field control device that the governor speed setting can increase from idling speed only after a definite short time delay after excitation is applied to the motor field or after the motor has synchronized. The object of this is to synchronize the motor and generator while the engine is developing a low torque and to accelerate after synchronization. The motor field will be controlled by a polarized relay or similar device sensitive to voltage or current and frequency induced in the synchronous motor field which will, when this frequency approaches a fixed low value, close a direct current supply to the motor field at that point in the cycle of voltage variation induced in this field which will cause most positive locking into synchronism and minimum hunting action between the motor and generator.

The synchronous motor field may be shorted through a resistance of appropriate value, when operating as an induction motor, to reduce induced voltages in the field winding at high slips and comparatively high applied alternating current voltages as when maneuvering, but for closely approaching synchronism this resistance should be shorted out as by a relay (not shown) responsive to frequency induced in the field winding.

The generator field will be controlled from a bridge control device, which control device will for very slow motor speeds, close the generator fields through a rheostat, thus generating and applying to the motor a low voltage which will only develop sufficient torque as an induction motor to operate the propeller at a low speed, then, for higher motor speeds, further movement of the control device will gradually reduce the rheostat resistance until a setting is reached corresponding to a motor speed approximating synchronism with the generator at idling speed. At this point, for further increase in speed, the generator field excitation will be temporarily increased either by control of the exciter field rheostats, doubling voltage applied from a double voltage three-wire system, paralleling generator fields normally in series, or other means such as grid control of rectifying tubes, etc. This will increase the motor speed to closely approaching synchronism. A relay will apply motor field and simultaneously reduce engine torque at this motor speed. A time relay or other equivalent mechanism will serve to restore the generator excitation and engine torque to normal after a definite short time interval, to allow for the motor to pull into step with the generator, after the field is applied to the motor. Still further movement of the control device would change the adjustment of the fuel limiting device for larger amounts of fuel per stroke causing the engine to develop greater torque and thus operate the propeller at higher speed and would adjust a normal generator and motor field rheostat setting to that suitable for efficient stable operation as a synchronous motor drive transmitting the torque which the corresponding fuel stop setting on the engine allows the engine to develop. A possible refinement would be to substitute motor-driven rheostats or controlled rectifiers with automatic control to maintain a close approach to unity power factor together with ample reserve stability at all synchronous speeds.

Figure 1:
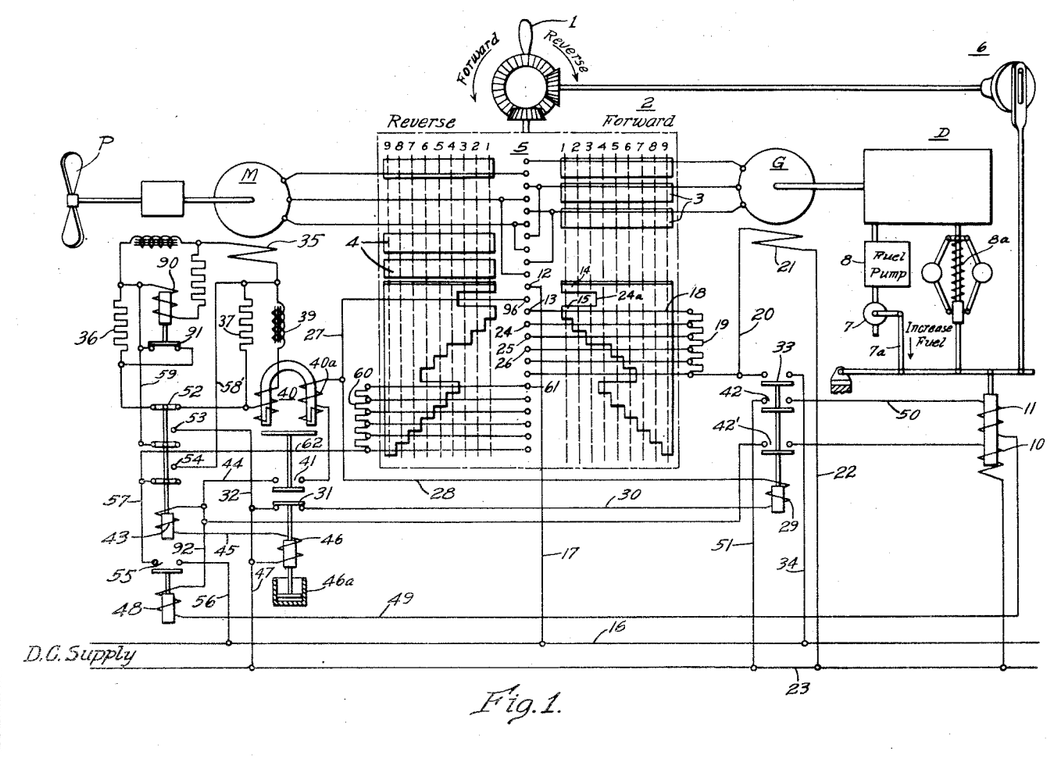
Figure 1 is a diagrammatic showing of a marine propulsion control system embodying the principles of my invention.

Referring more particularly to Fig. 1, D denotes a Diesel engine or other suitable variable speed prime mover to which is coupled the armature of an alternating current generator G. Generator G is adapted to energize the armature (or rotor) of a synchronous motor M also provided with a suitable winding for operation asynchronously as an induction motor, which armature is coupled direct or through suitable reduction gearing (not shown) to a propeller P or other load device. The direction of rotation of motor M is controllable by means of a control handle I which is geared to a drum type (or any other suitable type) of controller 2. It will be readily apparent that forward (ahead) or reverse (astern) motion of motor M may be secured by moving handle I to the left or right, respectively, by virtue of the change in phase sequence effected by the movable segments 3 or 4, respectively which cooperate with certain centrally located, vertically arranged, stationary contact members denoted generally by numeral 5. The control handle I is also geared to an eccentric device 6 which is adapted to vary the size of opening of the valve 7 thereby increasing the amount of fuel supply to fuel pump 8 in proportion to the degree of movement of control handle I in either the forward or reverse direction. In this manner the point of fuel cut off and release is varied to vary the amount of fuel supplied per power stroke of engine D and thus the torque output of the engine. Also the governor is set at idling speed for all motor speeds below synchronism.

Movement of connecting link 7a downwardly increases the fuel per stroke. Coil 10 energized simultaneously with the motor field through contact members 41, and after synchronization through contact members 42; will act with governor spring 8a to set the governor to a full speed when energized. On the other hand, coil 11, energized through contact members 42, will serve to reduce the engine torque during synchronization. The contour of the eccentric device 6 will be such that the governor can cause the engine to maintain idling speed but with a limited maximum torque through the range of the positions of control handle I corresponding to the operation of the main motor on its induction winding.

The operation of the device shown in Fig. 1 is as follows: Assume that the parts are in the position shown in the drawings wherein motor M is deenergized and at rest and assume that it is desired to start the motor in the forward (or ahead) direction. Handle I is moved leftwardly, thus moving the drum controller to the left to the first position, that is, the position wherein contact members 12 and 13 are bridged by controller segments 14 and 15, respectively, thereby interconnecting contact members 12 and 13. A circuit will now be completed from the positive terminal 16 of a source of direct current supply potential through conductor 17, bridged contact members 12—13, conductor 18, rheostat 19, conductor 20, generator field (or stator) winding 21, conductor 22 to the negative terminal 23 of the direct current supply source. Thus, energizing potential is provided which is limited by the entire resistance of rheostat 19. Now the engine is operating at idling speed on governor control. This reduced voltage energization of the generator field winding 21 will cause the generator to supply relatively low voltage at a frequency corresponding to the idling speed of the generator to the armature of motor M. This low alternating current voltage applied to the motor can develop only a low torque (varying about as the square of the applied voltage, corresponding to say (a) of Fig. 1a, and the motor will operate at a slip (and thus speed) corresponding to the intersection of the propeller-torque curve and the motor-torque curve (a).

As handle I is gradually moved more and more in the forward direction contact member 12 will be bridged with respect to contact members 24 and 25 successively, thereby progressively shunting more and more of the resistance of rheostat 19. Thus, the voltage applied to the generator field winding is progressively increased, thereby progressively increasing voltage generated by generator G at idling frequency, and causing the motor to develop increasing torque as b, c, d, of Fig. 1a. The motor will operate at a speed corresponding to the intersection of the respective motor torque curve with the propeller-torque curve. This will progressively increase the speed of motor M as a wound rotor or squirrel cage induction motor to near synchronous speed. When the motor speed reaches say .6 of synchronous speed, a relay 90, operating on frequency induced in the field, effects closing of contacts 91, thus shorting out motor field resistance 36. The power required at low speeds of the propeller is small, allowing such variable voltage, constant frequency operation at speeds up to say 90% of synchronism with idling speed, say corresponding to ⅓ of full speed and 1/27 of full power. The fourth forward position (corresponding to synchronous speed with the engine at idling speed) will effect bridging of contact members 12 and 26 by the contact segment 24a, thus completing a circuit from the positive terminal 16 through conductor 17, contact elements 12 and 26, conductors 27 and 28, relay actuating coil 29, conductor 30, the normally bridged contact members 31, conductor 32 to the negative terminal 23.

Energization of relay coil 29 effects closing of contact members 33 thus completing a circuit from the positive terminal 16 through conductor 34, contact members 33, conductor 20, field winding 21, conductor 22 to the negative terminal 23. Thus, full line voltage is applied to field winding 21. As the motor speed approaches sufficiently close to synchronism (say about 96% synchronous speed), the frequency induced in the motor field winding 35 (which has been heretofore short circuited through resistors 36 and 37 through bridged contact members 52) falls to such value that it effects energization of a polarized relay 40 (due to decrease of inductive reactance of impedance 39 due to decreased frequency) thereby effecting closing of contact members 41 on the proper half cycle for best pull-in torque. Polarized relay 40 is preferably provided with shading coils as shown to increase its time constant. Closing of contact members 41 (since contact members 26 and 42 are already closed) completes a circuit through relay actuating coil 43 which may be traced from the positive terminal 16 through conductor 17, contact members 12 and 96, conductor 27, coil 40a, contact members 41, and conductor 44, thence through two parallel paths, one going through relay coil 43, conductor 45, time limit relay coil 46, conductor 47 to the negative terminal 23 and the other going through conductor 92, relay coil 48, conductor 49, relay coil 11, conductor 50, contact members 42, conductor 51 to the negative terminal 23. Thus, relay coils 43, 46, 48, and 11 are simultaneously energized. Energization of relay coil 43 effects closing of contact members 53 and 54 and opening of contact members 52; energization of relay coil 46 has no immediate effect because of the dash pot 46a or other time limit device associated therewith; energization of relay coil 48 effects closing of contact members 55; and energization of relay coil 11 effects partial closing of valve 7, thereby restricting fuel supply to the engine. A circuit is thus completed which places the motor field winding 35 across the direct current source which may be traced from the positive terminal 16, through conductor 56, contact members 55, conductor 57, contact members 54, conductor 58', field winding 35, coil 90, conductor 59, contact members 53, conductor 32 to the negative terminal 23. Thus full voltage is applied to motor field winding 35. The time limit dash pot 46a associated with coil 46 is adjusted to allow a predetermined time interval for pulling into step, say one second, thence, it opens contact members 31 which interrupt the circuit through coil 29 thus opening contact members 33 and 42 and closing contact members 42' and reducing the voltage across the generator field winding to that determined by the setting of rheostat 19. Opening of contact members 42 interrupts the circuit through relay coil 48 and relay coil 11 thus reducing the voltage across the motor field winding to that determined by the position of the motor field rheostat 60 and opening valve 7, thus restoring fuel to the pump 8 and the engine and allowing the governor once more to control the fuel supply and allowing the setting of the control handle 1 to determine the extent of the fuel supply.

Figure 1A:
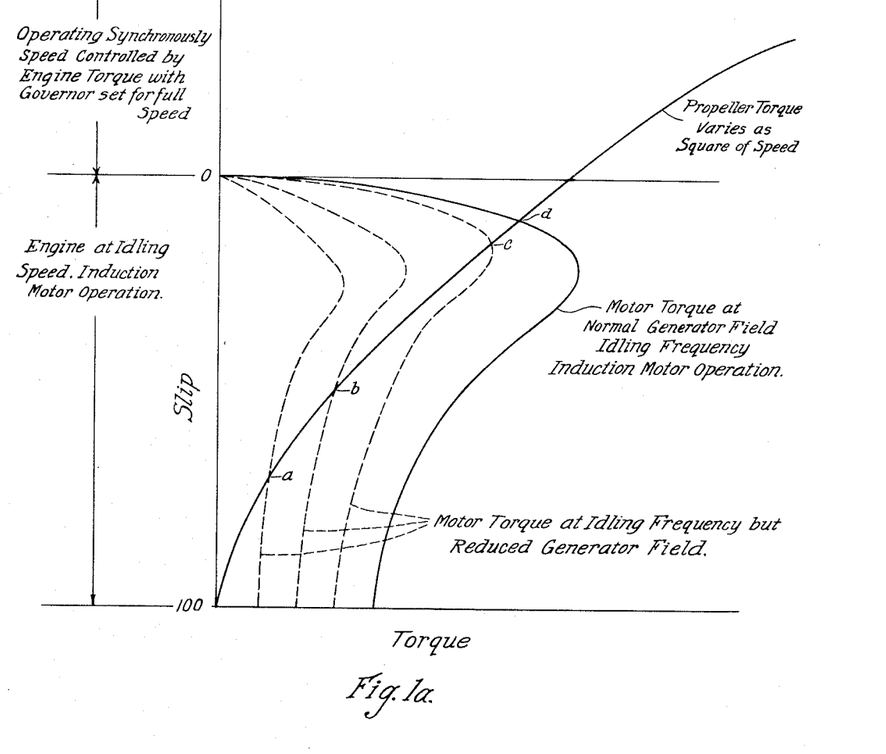
Fig. 1a shows curves illustrating certain characteristics of my system.

As the control handle is moved in the forward direction starting from the fourth point thereof, the fuel limiting eccentric device 6 progressively increases the torque developed by the engine while the generator field rheostat 19 and the motor field rheostat 60 are gradually short circuited, hence, the respective field energizations are gradually increased to stably transmit this increased torque until, (when the ninth point is reached) full line voltage of the direct current source is applied to both field windings and maximum speed of the motor M and propeller P is obtained. Referring to Fig. 1a, coil 10 was energized at the completion of synchronization thus setting the governor to full speed (or to a higher speed than idling speed) but to operate the motor at full speed requires a torque from the engine greater than allowed by fuel limiting eccentric device 6, therefore the engine, motor, and propeller operating synchronously will operate at a speed corresponding to the intersection of the curve of torque available at the motor (determined by position 6) and the propeller torque. The circuit through the motor field winding (at the fourth position of the drum) may be traced from the positive terminal 16, through conductor 17, contact members 12 and 61, rheostat 60, conductor 62, contact members 54, conductor 58', field winding 35, coil 90, conductor 59, contact members 53, conductor 32 to the negative terminal 23.

While the above description is directed to the operation of the propeller in the "forward" direction, it will be apparent that if reverse or "astern" operation is desired the control handle is moved in the opposite direction; hence it will effect movement of the drum controller 2 in a reverse direction. Inasmuch as the left-hand contact segments of the drum (with the exception of the upper reversing contact segments) are symmetrical with respect to those on the right, the same circuits as described above will be completed except now the motor M is rotating in the reverse direction.

For many applications, a great increase in generator field strength may not be required for synchronozing, the corresponding effect being obtained by momentarily closing the engine throttle thus allowing synchronization under reduced torque conditions. This coordination of the control of engine torque, and/or generator field with the closing of the motor field circuit may be through the action of the motor field relay or mechanically by a governor mechanism driven at a speed proportional to the difference in frequency between the generator and motor, with contacts corresponding to pole positions (as shown schematically in Fig. 2).

Figure 2:
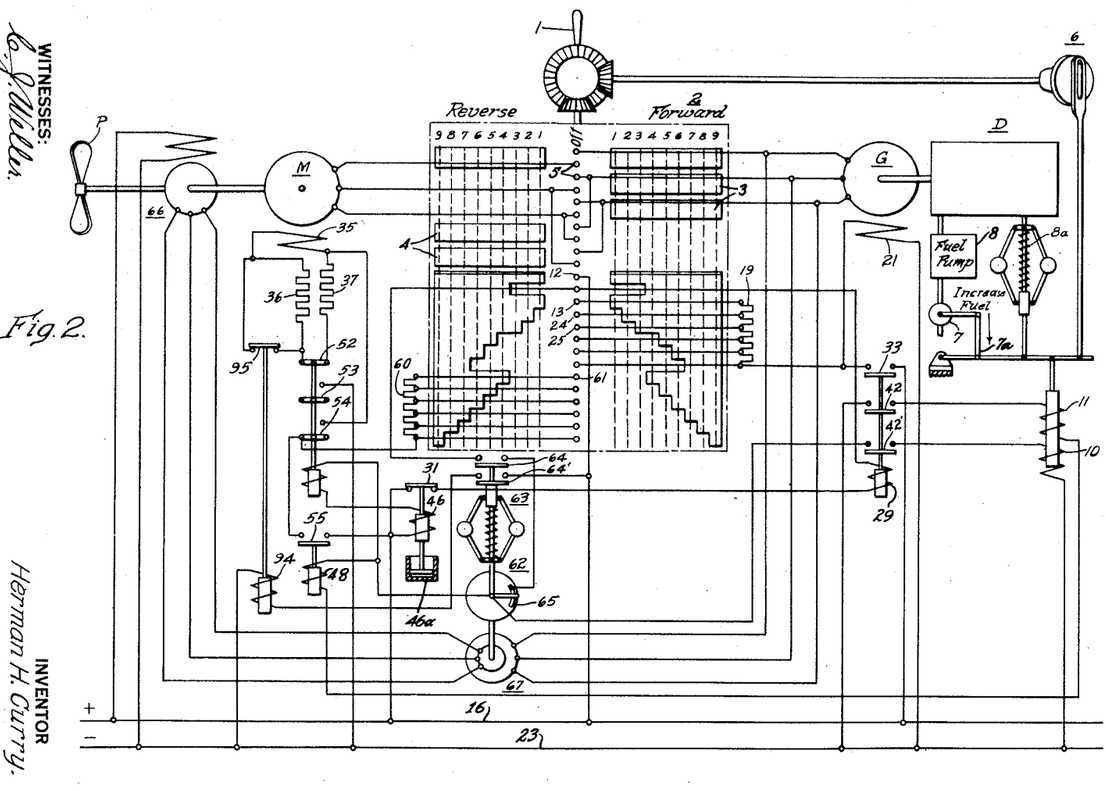
Fig. 2 is a diagrammatic showing of a modification of the system illustrated in Fig. 1.

Fig. 2 shows a system which is substantially identical to that in Fig. 1, hence identical parts are referred to by the same reference numerals. The only difference contained in Fig. 2 is the use of a different type of synchronizer or angle switching control device which takes the place of the polarized relay 40. In Fig. 2, a governor 63 is driven at a speed proportional to the difference in the motor and generator speeds so that the governor makes, say, one revolution while the motor slips two pole spaces, then as the slip frequency decreases sufficiently so as to come within synchronizing range contact members 64 close, and the contact members 65 close each time the proper pole relation exists for affording maximum pull-in torque (i. e. angle switching) hence, when both of these contacts are closed at the same time the same circuits will be completed as those formed when the polarized relay contact members 41 were closed in Fig. 1. The differential effect is obtained by the use of a synchro-tie system which includes generator 66 and motor 67. It will be apparent from the connections shown that motor 67 will run at a speed proportional to the difference in frequency between the voltage supplied by the main generator and that supplied by generator 66.

The action in synchronizing in this case is similar to that in Fig. 1 and may be briefly described as follows: Governor 63 driven at a speed proportional to the difference in speed of the motor and the generator by synchro-tie unit 66—67 is so adjusted that contact 64 is closed when the difference in speed is within the desired synchronizing range, say less than two cycles per second, and switch 65 is closed each time similar poles are in proper angular position for applying motor field. Suppose the bridge control device is at the stop position in the midposition of travel. All contactors except 52 are open. Engines are operating at idling speed under governor control. Movement in the ahead direction would close the proper reversing contactors, then progressively increase the generator fields by closing in order contactors 13, 24, and 25, gradually increasing the motor speed as a wound rotor or squirrel cage induction motor to near synchronous speed by increasing the voltage supplied by the generators. When the motor speed corresponds to 60% slip at idling frequency, the governor slows down and effects opening of contactor 64', thus deenergizing coil 94 and effecting shorting out the motor field resistance 36 by contact members 95. The power required at low speeds of the propeller is small, allowing such variable voltage, constant frequency operation at speeds up to say 90% of synchronism with idling speed. Now suppose operation at a speed corresponding to synchronism with idling generator speed is desired. Further movement of the bridge control devices will close contact member 33, as described previously, applying maximum generator field. When the motor reaches say 96% of synchronous speed, the governor will close contact 64 and when the motor poles are in proper relative position, contact members 65 close, closing the control circuit which opens contactors 52 and closes contactors 53, 54, and 55, placing field on the motor. Closing of contact members 64 also cuts off fuel to the engines as by coil 11 acting on the fuel limiting adjustment, and actuating coil 46 of the time delay relay which, after a definite short time opens contact members 31 and, in turn, opens contact members 33 and 42. This will open contacts 56 and deenergize coil 11 restoring fuel to the engine and reduce the motor and generator fields to normal under control of rheostats 60 and 19.

Further movement of the bridge control device up to full power in the ahead direction increases the fuel per stroke of the engines and adjusts rheostats 19 and 60 to proper positions for the increased torque. Operation in reverse would be similar except that the first movement of the contactor would close the proper contactors for "astern" operation.

Figure 3:
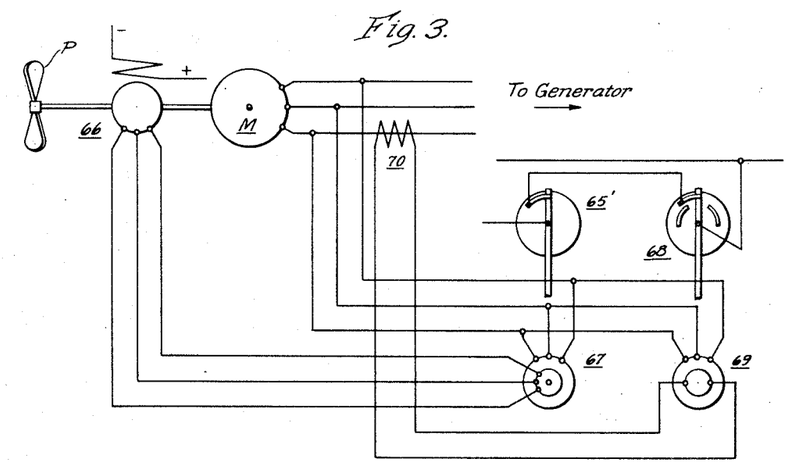
Fig. 3 is a diagrammatic showing of a modification of the synchronizing apparatus of Fig. 2.
Figure 4:
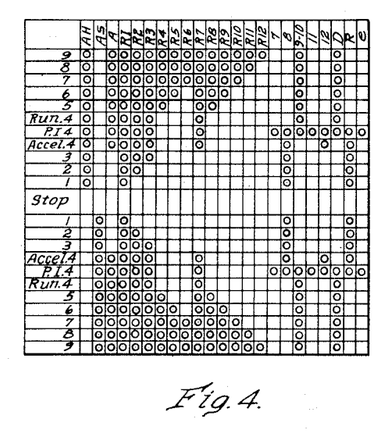
Fig. 4 is a sequence table of the control system of Fig. 1.
Figure 5:
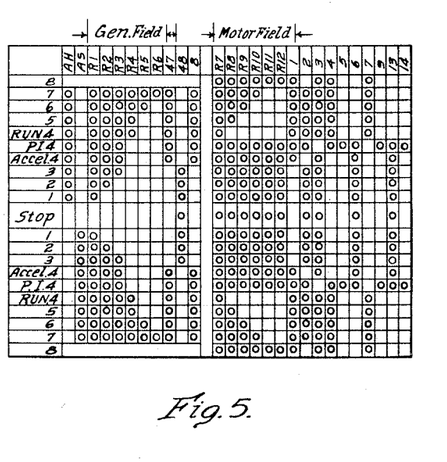
Fig. 5 is a sequence table of the control system of Fig. 6.

Fig. 3 shows a synchronizing scheme very similar to that in Fig. 2; hence identical parts are represented by the same reference numerals. Synchroscope 65' replaces governor contact members 65 of Fig. 2 showing proper angular relationship for applying the field and power factor meter 69 replaces contact members 64 of Fig. 2 in determining approach to synchronous speed. The stator of synchro-tie unit 69 is energized by the main generator voltage and the rotor is energized in accordance with the main generator current by virtue of current transformer 70.

Figure 6:
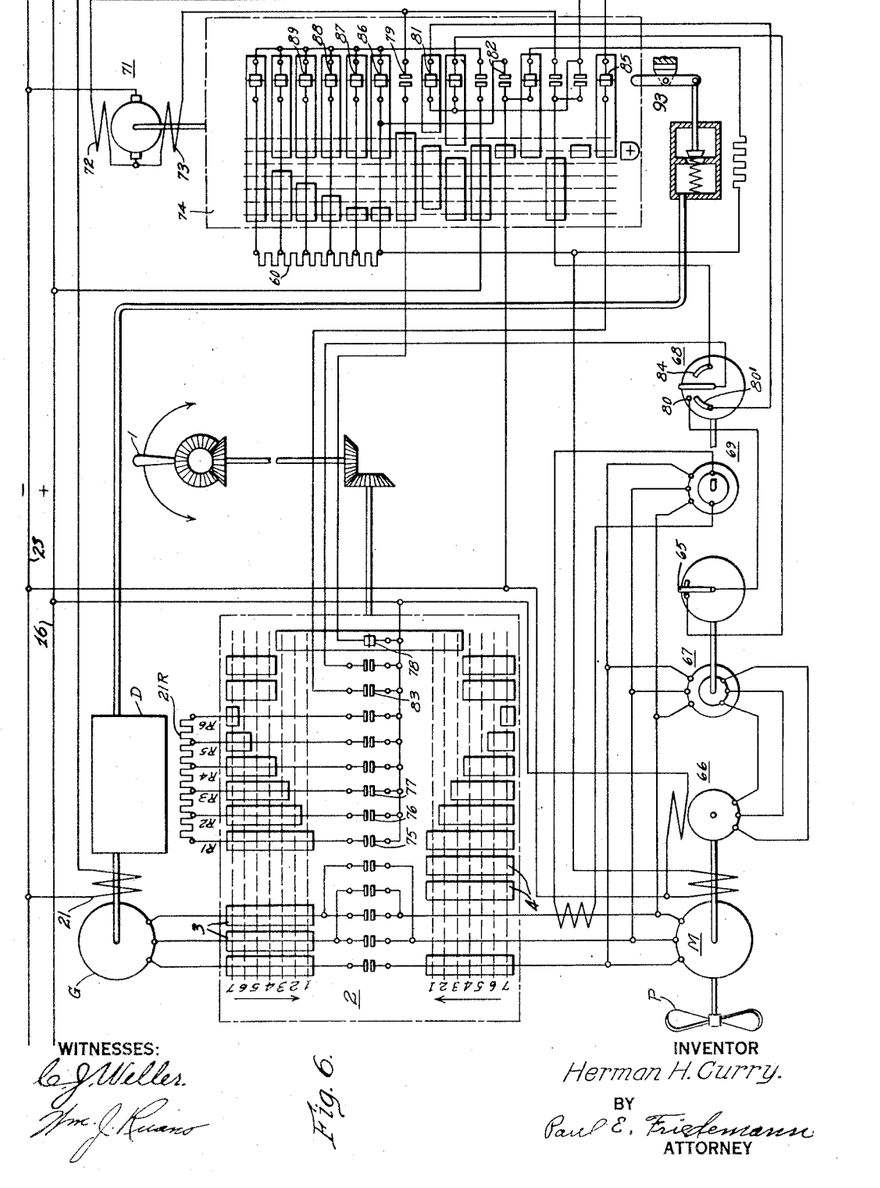
Fig. 6 is a diagrammatic showing of a further modification of my invention.

Fig. 6 shows a scheme similar to that in Figs. 2 and 3; hence identical parts are denoted by the same reference numerals. In Fig. 6, however, a split series field motor 71 having field windings 72 and 73 is used for rotating the motor field rheostat drum controller 74, the rotation of which is effective to vary the value of the motor field rheostat 60.

In circuits shown in Fig. 6, the generator field 21 is energized through the generator field rheostat 21R by progressively closing contact members 75, 76, and 77 of this rheostat to operate at progressively higher speeds below synchronism. In the stop position, contact member 78 has energized the winding 73 of the split field series rheostat control motor to turn the cam shaft to the extreme position limited by the opening of the motor driven conact member 79 in which position the motor field is shorted through the motor field discharge resistor.

As the motor speed increases, lagging power factor improves until the power factor meter 68 closes contact 80' causing the motor to run to near the other extreme position until stopped by motor driven limiting contact 81. In this position, the motor field is shorted by the motor driven contactor 82 to cause the motor to more closely approach synchronous speed and increase the accelerating torque in this speed range.

When a synchronous speed is desired, the bridge control closes contact 83 and as the motor driven contact 84 is now closed this applies full field to the generator.

As the motor accelerates and approaches sufficiently close to synchronism for positive synchronization the power factor increases until contact 80 is closed and when proper angular relation between the motor rotor and the generator exists, the contact members of synchroscope contact members 65 close, causing the control motor 71 to turn the cam shaft one step further to the extreme position stopped by limiting contact 82. This places full field on the motor and closes motor driven contact 83, cutting off the fuel supply engine.

As the motor pulls into step this over excitation causes the power factor to change to leading and close contact 84 reversing the control motor causing it to reduce the generator field to normal by opening the motor driven contact 85; restore fuel to the engine by opening motor driven contact arm 93; and reduce the motor field to that giving unity power by progressively opening the motor driven contacts 86, 87, 88, and 89. As the power factor changes from unity (lagging or leading) contact 80 or 84 causes the control motor to operate to increase or decrease the motor field as required to correct the power factor.

Figure 7:
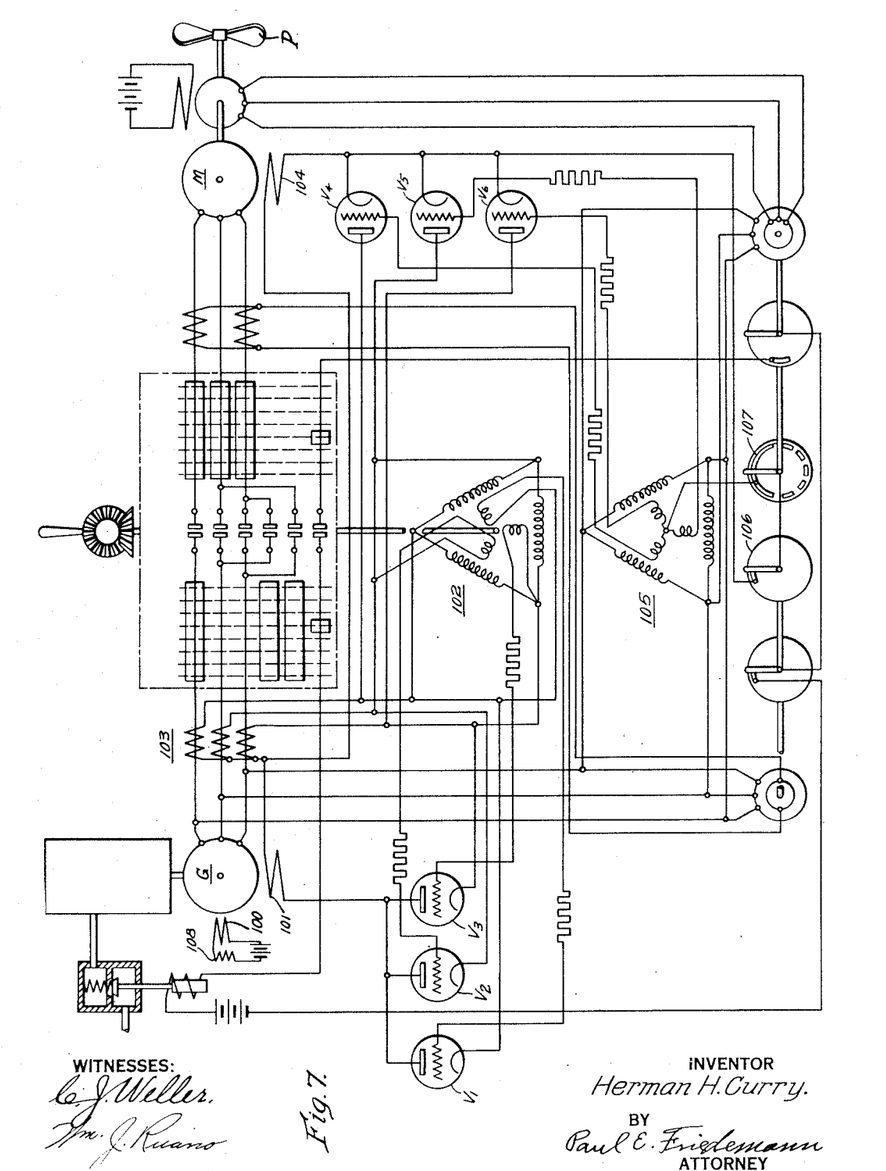
Fig. 7 is a diagrammatic showing of still another modification of my invention.

The modification in Fig. 7 shows a variation of the principles described above. Rectifiers are used to furnish part of the excitation. The main generator G will be provided with two field windings: 100 of relatively small size separately excited, and 101 the main field winding supplied D. C. from rectifier tubes $V_1$, $V_2$, $V_3$. The grids of these tubes will be excited through a phase changer 102 from the anode supply or from main generator voltage. Power will be supplied to these rectifiers by a transformer 103 whose primary is in series with secondary of main motor, or through a transformer from generator voltage or both in series, depending upon corresponding characteristic desired. This arrangement of field supply may be used to give an alternating current generator characteristic similar to a compound wound direct current generator, by providing for change of excitation with power factor of alternating current load and with amount of alternating current load.

Main motor M may be of synchronous type with a squirrel cage starting winding in the pole faces. Synchronous field 104 of motor M is supplied from transformer 103 through rectifier tubes $V_4$, $V_5$, $V_6$. The grids of these tubes will be excited through a phase changer 105 from main generator voltage through a contact 106 closed at proper relative speed and a contact 107 which is closed when there is a certain angular relation between motor and generator. The method of operation is essentially that outlined for the system where outside excitation and rheostatic field control is used, except in these particulars: A field may be maintained on separately excited generator field 100 at all times. Control over the motor speed range below that corresponding with synchronism with generator at idling speed of the engine will be by control of the generator field by control of rheostat 108, and phase changer 102 progressively increasing the generator field and thus the motor speed while the engine operates at idling speed under governor control. For motor speeds which may be covered synchronously greater field is applied to generator through adjustment of 102. As synchronous speed is approached and when motor armature is in correct angular relation to generator, field is applied to motor by exciting grids of rectifiers $V_4$, $V_5$, and $V_6$ through phase changer 105, or by voltage induced in the field coils falling below excitation voltage, at the same time the engine torque is reduced by fuel limiting mechanism cutting off all fuel. After a short time for synchronization or when the power factor approaches unity, fuel adjustment is restored to a position corresponding to the position of the bridge control to develop an engine torque corresponding to the speed desired, the governor is adjusted for a higher speed and phase changers 102 and 105 may be set as necessary to give a proper motor and generator field to transmit the torque corresponding to the fuel limit adjustment. The governor and fuel stop adjustment and the position of the phase changers may be coordinated with and set by the movement of the single bridge control, but the governor is not allowed to change from idling speed until (1) synchronization, (2) the time relay has operated, (3) power factor approached unity, (4) alternating current has dropped to normal value or such device as may be used to indicate synchronism has functioned.

An automatic control of excitation to obtain stability and a high power factor at synchronous speeds may be obtained by proper design of apparatus through the following action: The voltage supplied by 103 will increase as a function of main motor current giving a tendency to increase excitation with increased torque and lower power factor. When operating synchronously with grids of $V_4$, $V_5$, and $V_6$, causing these tubes to fire at a point in main generator voltage cycle determined by 105 a lagging main motor current will advance the time of firing in relation to the anode voltage and as these tubes will be working on the falling voltage part of the generator voltage curve. This will automatically increase motor excitation. In the same way a leading main motor current will reduce motor field excitation.

As $V_4$, $V_5$, $V_6$ can only fire when the rotor fields are in proper angular relation to the resultant revolving field of the stator to produce a positive torque because of action of contact 107 and also only when the voltage in the rotor is less than that applied by 103, the field will be intermittently excited as synchronism is approached and continuously excited when pulled into step.

As the power factor of a motor using a squirrel cage starting winding and/or a resistance in field winding for starting and operating at synchronous speeds is increasing rapidly as a point is reached where field may be applied for pulling into step and operating as a synchronous motor, this characteristic may be used to control grids of rectifiers as in Fig. 7.

Many variations in the method and apparatus for applying the principles involved are possible and the means named are merely as an example of the novel principles involved: The engine torque is automatically coordinated with the control of the motor and generator fields for operation at a speed corresponding to this torque condition. The motor field is automatically applied when a definite percentage of synchronous speed is reached and when the motor rotor fields are in proper angular relation to the magnetic field in the motor stator; and coordinated with this attempt at synchronizing, a simultaneous reduction of engine torque is made. This reduced torque and maximum fields are maintained for a short period of time sufficient to assure synchronization then automatically restored to values determined by the position of the control handle, or other similar control means. A simple means is provided of extending the speed range of the motor below the idling speed of the prime mover.

While a Diesel engine drive has been described, it will be readily apparent that my system can also be applied to a turbo-electric drive with advantage.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. In a ship propulsion system, in combination, a prime mover, an alternating current generator coupled thereto, a synchronous motor fed thereby, field winding for said generator and motor, a control system including a control lever which operates a controller for selectively securing a speed range extending from undersynchronous idling speed to a greater speed in either the ahead or astern direction including a generator field rheostat for varying the voltage supplied by the generator to the motor for accelerating said motor from undersynchronous idling speed to almost synchronous speed, means for increasing the generator field excitation, and applying direct current to the motor field upon attainment of synchronous idling speed and means operative after a predetermined time delay for allowing for synchronization for subsequently reducing said increased generator excitation to its normal value, and means operative upon further movement of said control lever, to vary the generator and motor field rheostat settings and the speed of said prime mover to afford greater than synchronous idling speed of said motor.

2. In a ship propulsion system, in combination, a prime mover, an alternating-current generator mechanically coupled thereto, a synchronous motor which is energizable by said generator, field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor.

3. In a ship propulsion system, in combination, a prime mover, an alternating-current generator mechanically coupled thereto, a synchronous motor which is energizable by said generator, field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor, a direct-current source of energizing potential which is automatically applied to said motor field winding in response to attainment of a predetermined speed of said motor and time delay means for automatically delaying increase of motor speed, following application of said direct-current source of energizing potential, for a predetermined period of time.

4. In a ship propulsion system, in combination, a prime mover, an alternating-current generator mechanically coupled thereto, a synchronous motor which is energizable by said generator, field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor, a fuel supply valve for varying the amount of fuel admitted to said prime mover, a governor connected to said control lever and fuel supply valve so that for any speed setting of the control lever above that corresponding to synchronous speed of the motor at engine idling speed the maximum amount of fuel admission will be determined by said control lever setting with said governor acting as a means for preventing excessive prime mover speed by restricting said valve further than the amount determined by said control lever setting.

5. In a ship propulsion system, in combination, a prime mover, an alternating-current generator mechanically coupled thereto, a synchronous motor which is energizable by said generator, field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor, a direct-current source of energizing potential which is automatically applied to said motor field winding in response to attainment of a predetermined speed of said motor and time delay means for automatically delaying increase of motor speed, following application of said direct-current source of energizing potential, for a predetermined period of time, a fuel supply valve for varying the amount of fuel admitted to said prime mover, a governor connected to said control lever and fuel supply valve so that for any speed setting of the control lever above that corresponding to synchronous speed of the motor at engine idling speed the maximum amount of fuel admission will be determined by said control lever setting with said governor acting as a means for preventing excessive prime mover speed by restricting said valve further than the amount determined by said control lever setting.

6. In a ship propulsion system, in combination, a prime mover, an alternating-current generator mechanically coupled thereto, a synchronous motor which is energizable by said generator, field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor, a variable resistor connected in series with said generator field winding and controllable by said control lever for so varying said generator field strength below idling speed of the prime mover.

7. In a ship propulsion system, in combination, a prime mover, an alternating-current generator mechanically coupled thereto, a synchronous motor which is energizable by said generator, field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor, a variable resistor connected in series with said generator field winding and controllable by said control lever for so varying said generator field strength below idling speed of the prime mover, a direct-current source of energizing potential which is automatically applied to said motor field winding in response to attainment of a predetermined speed by said motor and time delay means for automatically delaying increase of motor speed, following application of said direct-current source of energizing potential for a predetermined period of time.

8. In a ship propulsion system, in combination, a prime mover, an alternating-current generator mechanically coupled thereto, a synchronous motor which is energizable by said generator field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor, a fuel supply valve for varying the amount of fuel admitted to said prime mover, a governor connected to said control lever and fuel supply valve so that for any speed setting of the control lever above that corresponding to synchronous speed of the motor at engine idling speed the maximum amount of fuel admission will be determined by said control lever setting with said governor acting as a means for preventing excessive prime mover speed by restricting said valve further than the amount determined by said control lever setting, a variable resistor connected in series with said generator field winding and controllable by said control lever for so varying said generator field strength below idling speed of the prime mover.

9. In a ship propulsion system, in combination, a prime mover, an alternating-current generator mechanically coupled thereto, a synchronous motor which is energizable by said generator, field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor, a variable resistor connected in series with said generator field winding and controllable by said control lever for so varying said generator field strength below idling speed of the prime mover, and switching means for automatically effecting short circuiting of said variable resistor during synchronization of the motor.

10. In a ship propulsion system, in combination, a prime mover, an alternating-current generator mechanically coupled thereto, a synchronous motor which is energizable by said generator, field windings for said generator and motor, a control system including a control lever which operates a controller for selectively securing a speed range for said motor extending above and below synchronous speed of said motor at idling speed of the prime mover, said control above said idling speed being effected by varying the speed of the prime mover, thus the voltage and frequency of said generator, and the control below idling speed being effected by maintaining the speed of the prime mover constant and varying the generator field strength thereby maintaining constant frequency but variable voltage on the input terminals of said motor, a direct-current source of energizing potential which is automatically applied to said motor field winding in response to attainment of a predetermined speed of said motor and time delay means for automatically delaying increase of motor speed, following application of said direct-current source of energizing potential, for a predetermined period of time, and switching means operative by said time delay means after lapse of said time period, for inserting a resistance in series with said generator field winding.

HERMAN H. CURRY.